Patented Dec. 26, 1950 2,535,533

UNITED STATES PATENT OFFICE 2,535,533

PRODUCTION OF POLYALLYL DERIVATIVES

Edward Michael Evans, Tonbridge, and Harry Thurston Hookway, Croydon, England, assignors to British Resin Products Limited, London, England, a British company No Drawing. Application July 21, 1947, Serial No. 762,532. In Great Britain July 23, 1946

6 Claims. (Cl. 260—79.3)

This invention is for improvements in or relating to the production of polyallyl derivatives and relates in particular to the formation of new synthetic resinous compounds derived from allyl derivatives of 1,3,5-trimethylene trisulphone, which latter compound has the formula:

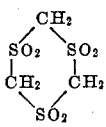

In our copending United States application Serial No. 762,533, filed July 21, 1947, now abandoned, of which a continuation-in-part was filed under Serial No. 87,135, April 12, 1949, we have described a process for the production of mono- and di- and triallyl and β-hydrocarbon-substituted-allyl derivatives of 1,3,5-trimethylene trisulphone, by reacting in the liquid phase, an allyl or beta-substituted allyl halide with 1,3,5-trimethylene sulphone, in the presence of an alkali metal or alkaline earth metal hydroxide or carbonate, the beta-substituent of the beta-substituted allyl halide being such as will not react with the methylene groups of the trimethylene sulphone; the reaction may be carried out in an aqueous medium.

We have found that we can produce valuable products of good chemical resistance by polymerisation of the said derivatives and accordingly the present invention provides a process for the production of polyallyl compounds which comprises polymerising a mono-, di-, or tri-allyl or mono-, di-, or tri-substituted allyl derivative of 1,3,5-trimethylene trisulphone e. g. by subjecting the compound to the action of heat, actinic light or a polymerisation catalyst either separately or in any combination. The novel products, find use in the known applications of chemically resistant resins and may serve as a basis for stoving varnishes.

The polymerisation may be carried out in the presence or absence of a solvent, a suitable polymerisation catalyst being, for example, benzoyl peroxide or it may be carried out in an aqueous emulsion or dispersion in which case suitable catalysts would be hydrogen peroxide or a persalt, such as ammonium persulphate. In general, the usual percompound polymerisation catalysts are suitable for use in this process. Reducing agents, which are known to act as polymerisation accelerators, may also be present in amounts less than have any substantial inhibitory action on the polymerisation; for instance, where a polymerisation catalyst is used, the reducing agent should be used in an amount less than is equivalent to the amount of said catalyst. Suitable reducing agents are hydroquinone, sodium bisulphite and sulphur dioxide but many other reducing agents can be used as will be well known to those skilled in the art. The following examples, in which the quantities are expressed in parts by weight, illustrate the manner in which the invention may be carried into effect:

Example 1.—1.2 parts of 1,3-diallyl-1,3,5-trimethylene trisulphone prepared as described in the example of our copending U. S. application Serial No. 762,533 are dissolved in 10 parts of dimethyl formamide and a film poured from this solution. The film when dry was heated at 160° C. for 30 minutes and yielded a product of good chemical resistance.

Example 2.—1.2 parts of 1,3-diallyl-1,3,5-trimethylene trisulphone are dissolved in 10 parts of dimethyl formamide and 0.06 benzoyl peroxide added to the solution. A film poured from this solution, when dry, was heated at 180° C. for 7 minutes and yielded a product of good chemical resistance similar to that produced in accordance with Example 1.

The process of the present invention is applicable to mixtures of allyl or β-substituted allyl derivatives of trimethylene trisulphone such as are produced by the process of our copending U. S. application Serial No. 762,533 and also includes the co-polymerisation of the said compounds with other polymerisable compounds.

We declare:

1. A process for the production of polyallyl compounds which comprises pouring a film from a solution of 1,3-diallyl-1,3,5-trimethylene trisulphone in dimethyl formamide, allowing the film to dry and thereafter heating the film to effect polymerisation.

2. A process for the production of polyallyl compounds which comprises pouring a film from a solution of 1,3-diallyl-1,3,5-trimethylene trisulphone in dimethyl formamide containing benzoyl peroxide, allowing the film to dry and thereafter heating the film to effect polymerisation.

3. Poly(allyl and β-hydrocarbon-substituted allyl derivatives of 1,3,5-trimethylene trisulphone).

4. Poly(1,3-diallyl-1,3,5-trimethylene trisulphone).

5. A process for the production of polyallyl compounds which comprises, subjecting a compound selected from the group consisting of mono-, di- and triallyl and beta-hydrocarbon-substituted allyl derivatives of 1,3,5-trimethylene trisulphone to the action of heat in the presence of a percompound polymerisation catalyst.

6. A process for the production of polyallyl compounds which comprises, subjecting a compound selected from the group consisting of mono-, di- and triallyl and beta-hydrocarbon-substituted allyl derivatives of 1,3,5-trimethylene trisulphone to the action of heat in the presence of a percompound polymerisation catalyst, and less than an equivalent amount thereof of a reducing agent.

EDWARD MICHAEL EVANS.
HARRY THURSTON HOOKWAY.

REFERENCES CITED

The following references are of record in the file of this patent:

UNITED STATES PATENTS

| Number | Name | Date |
| --- | --- | --- |
| 2,418,991 | Shokal | Apr. 15, 1947 |